United States Patent [19]

Cheng

[11] Patent Number: 5,061,306
[45] Date of Patent: Oct. 29, 1991

[54] MULTIPLE EFFECT ABSORPTION REFRIGERATION PROCESSES AND APPARATUSES FOR USE THEREIN

[76] Inventor: Chen-Yen Cheng, 9605 LaPlaya St. NE., Albuqerque, N. Mex. 87111

[21] Appl. No.: 518,077

[22] Filed: May 1, 1990

[51] Int. Cl.$^5$ ............................................. B01D 9/04
[52] U.S. Cl. ........................................ 62/532; 62/12; 62/123
[58] Field of Search ...................... 62/12, 59, 123, 434, 62/532

[56] References Cited

U.S. PATENT DOCUMENTS

| | | | |
|---|---|---|---|
| 4,236,382 | 12/1980 | Cheng et al. | 62/537 |
| 4,505,728 | 3/1985 | Cheng et al. | 62/542 |
| 4,578,093 | 3/1986 | Cheng et al. | 62/532 |
| 4,650,507 | 3/1987 | Cheng et al. | 62/12 |
| 4,654,064 | 3/1987 | Cheng et al. | 62/532 |
| 4,810,274 | 3/1989 | Cheng et al. | 62/12 |

*Primary Examiner*—Ronald C. Capossela

[57] ABSTRACT

In a process of the present invention, a first water vapor at a is absorbed into a solution containing water and a non-volatile solute such as lithium bromide at substantially the same pressure but at a temperature that is higher than the pure water saturation temperature corresponding to the absorption pressure. The heat released in absorption is transmitted to a mass of pure water to generate a second water vapor at a second pressure that is substantially higher than that of the first vapor, therby diluting the absorbing solution. The absorption of first vapor, generation of second vapor and dilution of the absorbing solution are collectively referred to as a vapor pressure enhancement operation activated by dilution of the absorbing solution. The methods and apparatuses of the present invention may also be used in enhancing vapor pressure of a non-aqueous solvent. In one varation, the vapor pressure enhancement is accomplished across a vertical heat transfer wall provided with two falling liquid films. The film on one side is an absorbing solution while on the other is pure water. First vapor brought in contact with the absorbing solution is absorbed at substantially the same pressure but at a temperature higher than the pure water saturation temperature. The heat released is transmitted through the vertical heat transfer wall to vaporize water and generate second vapor at a second pressure that is higher than that of the first vapor.

9 Claims, 9 Drawing Sheets

MULTIPLE EFFECT ABSORPTION REFRIGERATION PROCESSES AND APPARATUSES FOR USE THEREIN

RELATED APPLICATION

This application is related to the following application:

"Solid-Liquid-Vapor Multiple Phase Transformation Process with Coupled Absorption Melting Operations." Applicant: Chen-Yen Cheng; Filing Date: Feb. 27, 1990; Ser. No.: 07/486081.

BACKGROUND OF THE INVENTION

1. Field of Invention

The processes and apparatuses of the present invention are to be used in absorption refrigeration systems, each using a volatile solvent such as water and a non-volatile solute such as lithium bromide, lithium chloride and calcium chloride, that are used to attain high level refrigeration.

A conventional absorption refrigeration system uses a single step vapor absorption using an aqueous lithium bromide solution. The degree of temperature lifting attainable is relatively small. A system of the present invention uses more than one step of vapor absorption and can attain a higher degree of temperature lifting.

A system of the present invention is characterized in using low grade heat, such as waste heat, in accomplishing a high degree of temperature lifting of heat energy. A multi-effect absorption refrigeration system may be considered as a reversed system of a multiple effect evaporation system.

The processes and apparatuses may be used in the following systems:

(1) Systems for conducting solid-liquid-vapor(S/L/V) multiple phase transformation processes such as vacuum freezing processes, distillative freezing processes and vacuum freezing eutectic freezing processes.

(2) Systems for conducting two phase fractional crystallization processes such as in dewaxing of lubrication oil and column crystallization.

(3) Chemical processing systems such as in recovery of condensable components out of gas streams, e.g. recovery of condensable hydrocarbon from natural gas.

(4) Systems for conducting freeze drying.

(5) Systems for making ice and ice cream.

(6) Systems for cool storage (thermal storage).

(7) Systems for product cooling such as in meat packing.

(8) Systems for cooling liquids such as fruit juices, beer and wine.

2. Brief Description of Prior Art

A commercial absorption refrigeration unit has (a) an evaporator section, (b) an absorber section, (c) a generator section, and (d) a condenser section.

An absorption refrigeration unit uses water as the refrigerant under a deep vacuum. The unit operates on the simple principle that under low absolute pressure (vacuum), water takes up heat and vaporizes at a low temperature. For example: at 0.25 inches of mercury absolute pressure, water boils at 40 degrees Fahrenheit. To obtain the energy required, it takes heat from and there chills, another liquid (usually water). The chilled liquid can then be used for cooling purposes. These operations are conducted in the evaporator section of the unit.

To make the cooling process continuous, the vaporized refrigerant water is absorbed by an absorbing solution, usually a lithium bromide water solution. The removal of refrigerant vapor by absorption keeps pressure in the evaporator section low enough for vaporization to continue. Heat of absorption is released and is removed through heat transfer coils by a stream of cooling water. The absorbing solution becomes a diluted absorbing solution. These operations are conducted in the absorber section of the unit.

The diluted absorbing solution is pumped to the generator section where water is vaporized from it at a pressure considerably higher than that in the evaporator section described. A stream of high pressure vapor and concentrated absorbing solution are formed. These operations are conducted in the generator section of the unit. The concentrated absorbing solution is heat exchanged with the diluted absorbing solution and is then returned to the absorber section.

The high pressure water vapor is condensed by heat exchange with a stream of cooling water to form a condensate. The condensate is returned to the evaporator section.

The chilled water produced by a conventional single effect absorption refrigeration is generally limited to 40 degrees Fahrenheit. The temperature limit attanable by a single effect operation is set by the need of using cooling water near or above ambient temperature and by a limitation of formation of lithium bromide hydrate crystals and anhydrous lithium bromide crystals.

Brief Description of the Invention

In a process of the present invention, a first water vapor at a first pressure is absorbed into a absorbing solution containing water and a non-volatile solute such as lithium bromide, lithium chloride or calcium chloride at substantially the same pressure but at a temperature that is higher than the pure water saturation temperature corresponding to the absorption pressure. The heat released in the absorption operation is transmitted to a mass of pure water to generate a second water vapor at a second pressure that is substantially higher than that of the first vapor. The absorbing solution is diluted in this absorption operation. The absorption of the first vapor, the generation of the second vapor and the dilution of the absorbing solution are collectively referred to as a vapor pressure enhancement operation activated by dilution of the absorbing solution. Two types of vapor pressure enhancement units are introduced: viz. Type A units and Type B units. The methods and apparatuses of the present invention may also be used in enhancing vapor pressure of a non-aqueous solvent.

In a Type A system, the vapor pressure enhancement is accomplished across a vertical heat transfer wall provided with two falling liquid films. The film on one side (Zone 1) is a liquid film of an absorbing solution; the film on the other side (Zone 2) is a liquid film of pure water. When a first vapor at a first pressure is brought in contact with the absorbing solution in Zone 1, the first vapor is absorbed at substantially the same pressure but at a temperature higher than the pure water saturation temperature corresponding to the absorption pressure. The heat released in this absorption operation is transmitted through the vertical heat transfer wall to the falling pure water film to vaporize water and generate second vapor at a second pressure that is higher than that of the first vapor. Therefore, the pure water saturation temperature of the second vapor is higher than that of the first vapor. The effects of this operation are that the first vapor is absorbed into the absorbing solution, the second vapor at a pressure higher than that of the first vapor is generated and the absorbing solution is diluted. A Type A unit may be referred to as a double liquid film unit.

A Type B system also has a first processing zone (Zone 1) and a second processing zone (Zone 2). A heat exchange coil is placed in Zone 1 and another heat exchange coil is placed in Zone 2. A first vapor is absorbed into an absorbing solution in Zone 1 and a stream of second vapor is generated from water in Zone 2. The two heat exchange coils are connected to form a loop, and a circulating pump is used to circulate a heat transfer medium through the two coils. Heat of absorption is removed by the circulating medium which releases heat to vaporize water. A Type B unit may be referred to as a looped coil unit.

In a multiple effect absorption refrigeration system of the present invention, there are more than one vapor pressure enhancement units. A first vapor at a first pressure is pressure enhanced in a first enhancement unit by a first absorbing solution to become a second vapor at a second pressure; the second vapor is pressure enhanced in a second enhancement unit to become a third vapor at a third pressure by a second absorbing solution, and so on. A high degree temperature lifting is made possible. Therefore, it is possible to reach a low temperature that has not been attainable by a conventional single effect absorption refrigeration. It is also possible to avoid formation of solute crystals from the absorbing solution. It is therefore possible to provide refrigeration needed in such low temperature operations as vacuum freezing operations distillative freezing operations, ice formation operations, column crystallization, eutectic freezing, and low temperature condensation operations. It is noted that low grade heat may be used to activate a multi-effect absorption refrigeration operations of the present invention.

Brief Description of Drawings

The present invention introduces a new way of enhancing vapor pressure by coupling the pressure enhancing operations with an operation of diluting an absorbing solution. There are Type A enhancement units and Type B enhancement units. An operation conducted in a Type A enhancement unit is referred to as a Type A enhancement operation; an operation conducted in a Type B enhancement unit is referred to as a Type B enhancement operation.

FIG. 1 illustrates a Type A unit for conducting the vapor pressure enhancement operation. It shows that a falling film of an absorbing solution and a falling film of a mass of solvent liquid are formed on the two surfaces of a vertical heat conductive wall. A first vapor is absorbed into the film of absorbing solution; a mass of second vapor is generated from the film of solvent liquid.

FIG. 3 illustrates a Type B system for conducting the vapor pressure enhancement operation. The system comprises a first processing zone, Z-1, in which a first vapor is absorbed into a first absorbing solution to become a second absorbing solution and a second processing zone, Z-2, in which a mass of solvent liquid is vaporized to become a second vapor. A circulating heat transfer medium is circulated between the two processing zones to remove the heat released in the absorption operation and supply the heat needed in the vaporization operation.

The operating conditions of the Type B operation are illustrated in FIG. 4.

FIGS. 7 and 9 illustrate integrated systems utilizing Type A vapor pressure enhancement operations. In each of these systems, a first vapor formed from any process is subjected to a Type A vapor pressure enhancement operation to become a second vapor and the second vapor is absorbed into another absorbing solution with the heat released in the second absorption operation removed by a stream of cooling medium at a readily available temperature, such as cooling water at ambient temperature. The diluted absorbing solutions are regenerated, heat exchanged and recycled. The two absorbing solutions used may be used in series, in parallel, or be used independently. The system of FIG. 7 uses a series approach; the system of FIG. 9 uses a parallel arrangement.

The operating conditions of this system are illustrated by FIG. 12.

FIG. 14 illustrates a multiple phase transformation process with coupled vapor absorption and crystal melting operations. In this system, the first vapor formed in a solid-liquid-vapor multiple phase transformation operation is subjected to a Type A vapor pressure enhancement operation using a first absorbing solution to thereby produce a second vapor whose pressure is higher than the triple point pressure of the solvent crystals. The second vapor is brought in contact with a mass of solvent crystals to thereby simultaneously condense the second vapor and melt the solvent crystals. The system requires an auxiliary refrigeration system to maintain the system under a properly balanced state. The needed auxiliary refrigeration is accomplished by absorbing a fraction of the second vapor into a second absorbing solution and removing the heat of absorption by a cooling medium at a readily available temperature. The first absorbing solution and the second absorbing solution may be the same solution and be regenerated together.

PREFERRED EMBODIMENT OF THE INVENTION

A new method of absorbing a first and low pressure vapor into an absorbing solution and generating an equivalent amount of second vapor at an elevated pressure is introduced. These operations are accomplished by diluting an absorbing solution. Two types of units for accomplishing the vapor pressure ehnancement are introduced: viz. Type A units and Type B units. A Type A unit may be referred to as a double falling liquid film unit; a Type B unit may be referred to as a looped coil unit. An operation conducted in a Type A unit is referred to as a Type A enhancement operation; an operation conducted in a Type B unit is referred to as a Type B enhancement operation.

Figure 1:
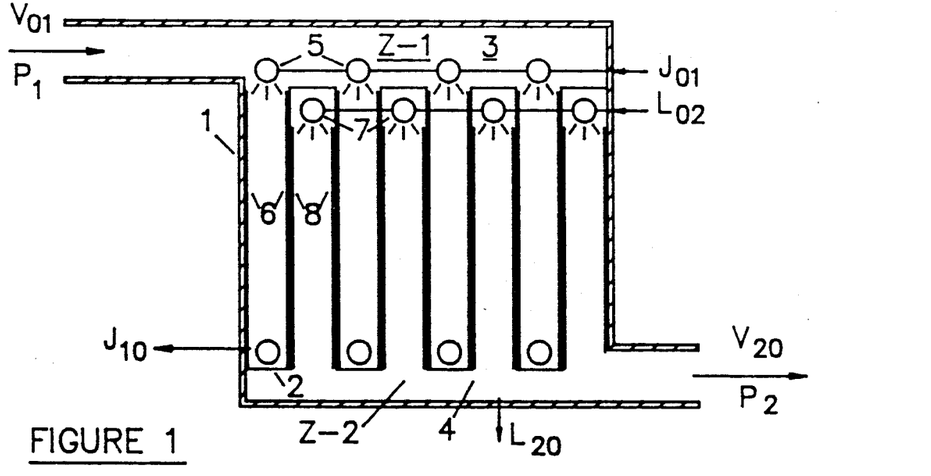

FIG. 1 illustrates a Type A unit and is used to illustrate a Type A enhancement operation. The unit comprises a vacuum enclosure 1, a partitioner 2 having a multitude of vertical heat transfer walls separating the unit into a first processing zone 3 (Zone 1) and a second processing zone 4 (Zone 2). The unit has a first set of sprayers 5 for spraying an absorbing solution on one side of the vertical walls to form vertical liquid films 6 of the absorbing solution in Zone 1; the unit has a second set of sprayers 7 for spraying a mass of water on the other side of the vertical walls to form vertical water films 8 in Zone 2. The absorbing solution $J_{01}$ enters the sprayer 5, absorbs the first vapor at about the pressure $P_1$ of the first vapor but at a temperature substantially higher than the pure water saturation temperature at the first vapor pressure. The absorbing solution is diluted and the diluted solution is discharged as the $J_{10}$ stream. The water stream $L_{02}$ is applied to the vertical walls. The heat of absorption is transmitted through the vertical walls and to the falling water film to generate a second vapor $V_{20}$ at a second pressure $P_2$. The excess water $L_{20}$ is recycled to the unit with a make up water to form the $L_{02}$ stream. The pressure $P_2$ of the second vapor is substantially higher than $P_1$ of the first vapor. Therefore, the operation is referred to as a Type A vapor pressure enhancement operation.

Figure 2:
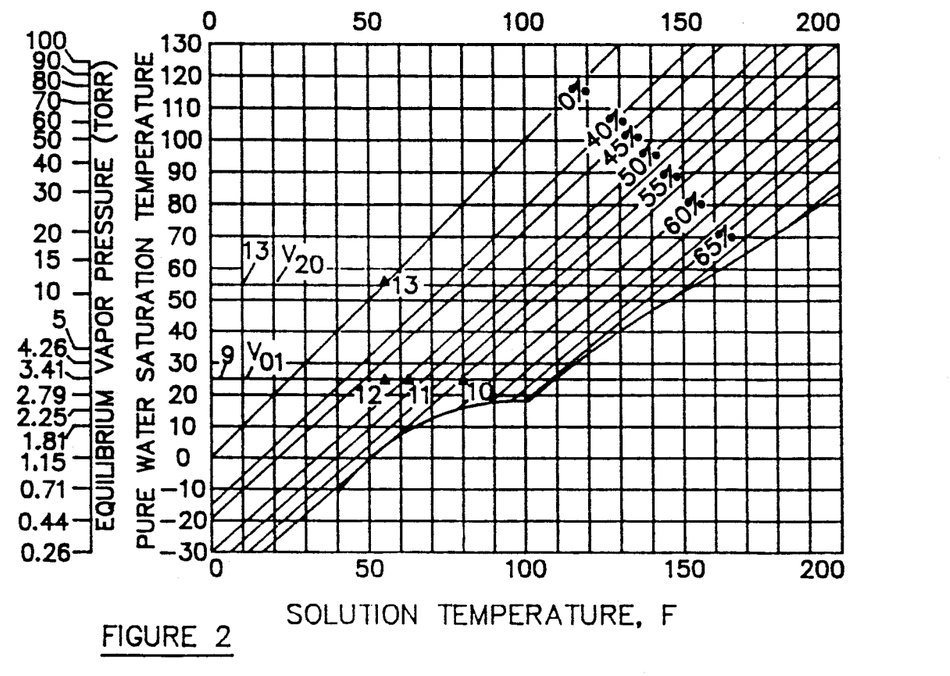
FIG. 2 illustrates a equilibrium phase diagram of lithium bromide-water system. The operating conditions of the vapor pressure enhancement operation described are illustrated on FIG. 2.

FIG. 2 shows the relation between the vapor pressure in torrs of an aqueous lithium bromide solution and the solution concentration and the solution temperature. Pure water saturation temperatures corresponding to various pressures are also shown along a separate y-axis. The figure also shows the saturation line of anhydrous lithium bromide and the saturation line of hydrated lithium bromide.

The operating conditions of the Type A vapor pressure enhancement operation are also illustrated in FIG. 2. It shows that the first vapor enters the unit under a first pressure $P_1$ illustrated by the horizontal line 9. The concentration of the initial absorbing solution $J_{01}$ and the initial absorbing temperature are represented by point 10. As the absorption operation progresses, the concentrate of the absorbing solution and the absorbing temperature decrease. The concentration of the final solution $J_{10}$ and the final absorbing temperature are represented by point 11. There is a temperature differential between the two liquid films needed for heat transfer. Therefore, the temperature of the falling water film is illustrated by point 12. The condition of the second vapor is illustrated by point 13. It is seen that the pressure $P_2$ of second vapor at point 13 is substantially higher than the pressure of the first vapor at point 9. This pressure increase is referred to as the pressure enhancement of the vapor streams. It is seen that this pressure enhancement is accomplished by coupling the pressure enhancement with dilution of the absorbing solution.

Figure 3:
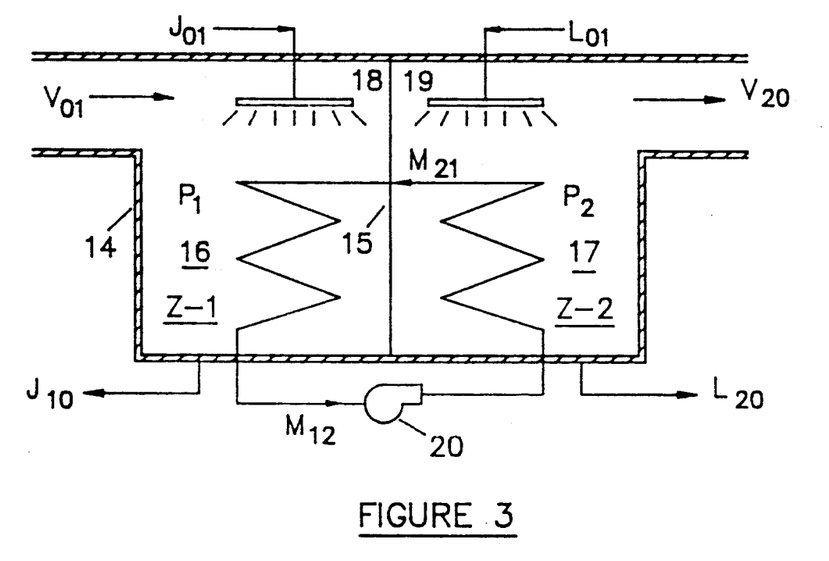

FIG. 3 illustrates a Type B pressure enhancement unit. It comprises a vacuum enclosure 14, a verical partitioner 15 separating the unit into a first processing zone 16 (Zone 1) and a second processing zone 17 (Zone 2), a first spraying device 18 for spraying an absorbing solution $J_{01}$, a second spraying device 19 for spraying water $L_{02}$. There are heat exchange coils in the two zones connected together with a circulating pump 20. A heat transfer medium is circulated in the loop by the circulation pump. The medium $M_{21}$ enters the first zone and absorbs the heat of absorption and leaves the zone as $M_{12}$. The medium enters the second zone and releases heat to the water in Zone 2 to generate second vapor $V_{20}$ at a second pressure $P_2$. The medium is cooled to become the $M_{21}$ stream. A part of the water introduced in the second zone vaporizes and becomes the second vapor; the rest is discharged as the $L_{20}$ stream. Make up water is added to the $L_{20}$ stream to form the $L_{02}$ stream.

Figure 4:
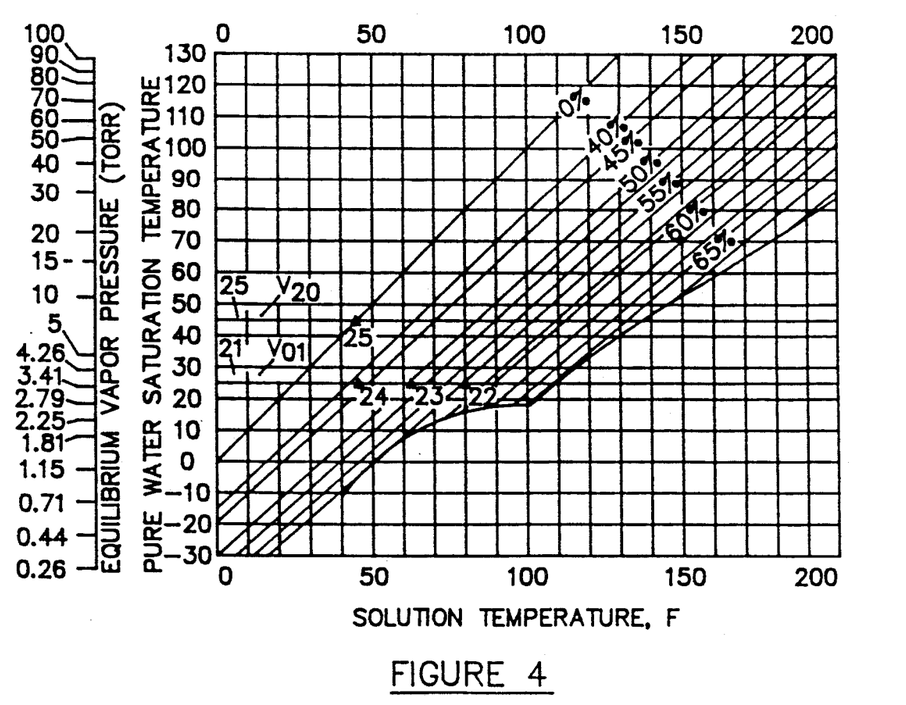

FIG. 4 is the phase diagram of lithium bromide-water mixtures. The operating conditions of the Type B pressure enhancement operation described above are illustrated in the figure. The first vapor $V_{01}$ enters at a first pressure illustrated by the horizontal line 21. The initial absorption condition is illustrated by point 22. The absorbing solution is diluted and the absorbing temperature is lowered. So, the final absorbing condition is illustrated by point 23. Since the temperature of the heat transfer medium is raised in Zone 1 and lowered in Zone 2, the temperature 24 at which the second vapor is generated is substantially lower than that of the final absorbing condition 23. It is noted that this temperature differential between points 23 and 24 in the Type B system is greater than that between points 11 and 12 in the Type A system. Therefore, the pressure 25 of the second vapor generated is lower than 13 in the Type A unit when both are operated under equivalent inlet conditions. It is noted that the component parts needed in assembling a Type B unit are commercially available from suppliers of conventional absorption refrigeration systems.

Figure 5:
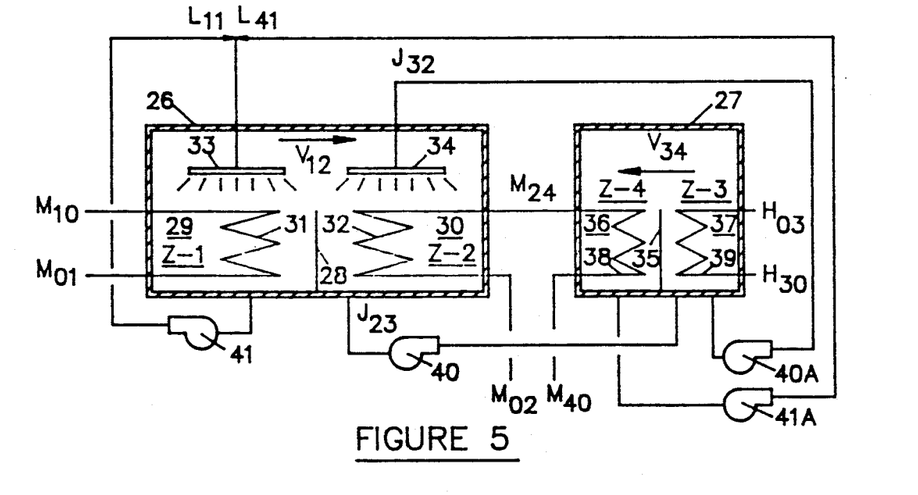
FIG. 5 illustrates a conventional absorption refrigeration system using an absorbing solution comprising water and a non-volatile solute, usually lithium bromide. The operating conditions of the system are illustrated in FIG. 6. These figures are used to illustrate the performance limitations of a conventional system.
Figure 6:
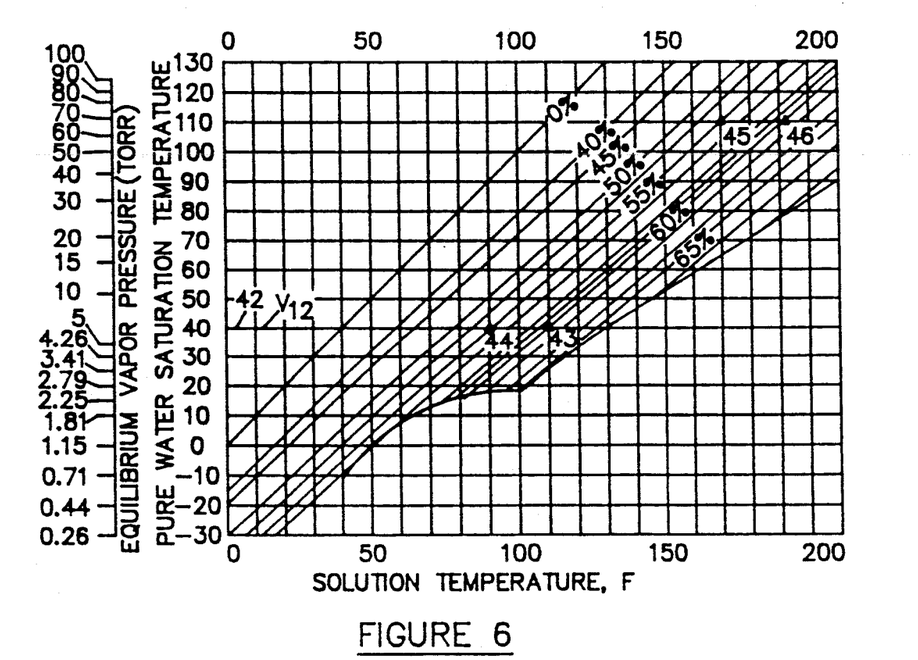

FIG. 5 illustrates a conventional single effect absorption refrigeration system and FIG. 6 illustreates the operating conditions. The system comprises a first vessel 26 and a second vessel 27. The first vessel contains a separating wall 28 which separates the vessel a first processing zone 29 (Zone 1) and a second processing zone 30 (Zone 2). There are heat exchange coils 31 and 32 in the two zones and there are two spraying devices 33 and 34 in the two zones. There is a partitioner 35 that separates the second vessel into a third processing zone 37 and a fourth processing zone 36. There are heat exchange coils 39 and 38 in the two zones. The two coils 32 and 36 in the second zone and the fourth zone are connected to form a loop.

Zone 1 is an evaporator section in which water $L_{11}$ and $L_{41}$ are sprayed and flash vaporized to form a first vapor stream $V_{12}$ and cool the coil 31. In a typical application, a heat transfer medium $M_{10}$ enters at a temperature of say 60° F. and is cooled in the coil to become a chilled water stream at a temperature of say 40° F. Zone 2 is an absorber section. The first vapor is absorbed into an absorbing solution $J_{32}$ that is sprayed into the zone by the sprayer. The heat released in the absorption operation is released to a heat exchange medium $M_{02}$. The heated medium exits as the $M_{34}$ stream. The diluted absorbing solution $J_{23}$ is pumped by a pump 40 to Zone 3, which is a generator section. The diluted absorbing solution is heated by a heating medium $H_{03}$ which is cooled and exits as $H_{30}$ stream. A vapor stream $V_{34}$ is generated and the absorbing solution is concentrated to the original strength. The concentrated solution is heat exchanged with the dilute absorbing solution (the heat exchanger is not shown in the figure) and is pumped by a pump 40A and returned to Zone 2 as the $J_{32}$ stream. The vapor stream $V_{34}$ is condensed by a cooling medium. The condensate $L_{41}$ is pumped by a pump 41A to Zone 1. The cooling medium $M_{02}$ is used to remove the heat of absorption in Zone 2 to become the $M_{34}$ stream, which is further used to absorb the heat of condensation in Zone 4 and then discharged from the system as the $M_{40}$ stream. A part of the water sprayed in Zone 1 is vaporized. The remainder, $L_{11}$, is pumped by a pump 41 as recycle to Zone 1. The pressure of the first vapor $V_{12}$ is illustrated by the horizontal line 42 in FIG. 6. The initial absorbing condition and the final absorbing condition in Zone 2 are illustrated by points 43 and 44 respectively. The diluted absorbing solution is heat exchanged and sent into the generator (Zone 3). The initial condition and the final condition in the generator are respectively illustrated by points 45 and 46.

The degree of temperature lifting that can be accomplished in a single effect absorption refrigeration is rather limited, because of the presence of saturation curves of lithium bromide as lithium bromide hydrate and because of the need of rejecting heat to readily available cooling water. In order to reject heat to cooling water at 90° F., the absorbing temperature has to be around 110° F. However, in order to absorb water vapor at 1.81 torrs, for example, the absorbing temperature has to be less than 60° F. in order not to form crystals of lithium bromide hydrate crystals. It will be shown that by using a multiple effect absorption refrigeration system of the present invention, the problem described can be avoided. The process can circumvent the saturation region.

Figure 7:
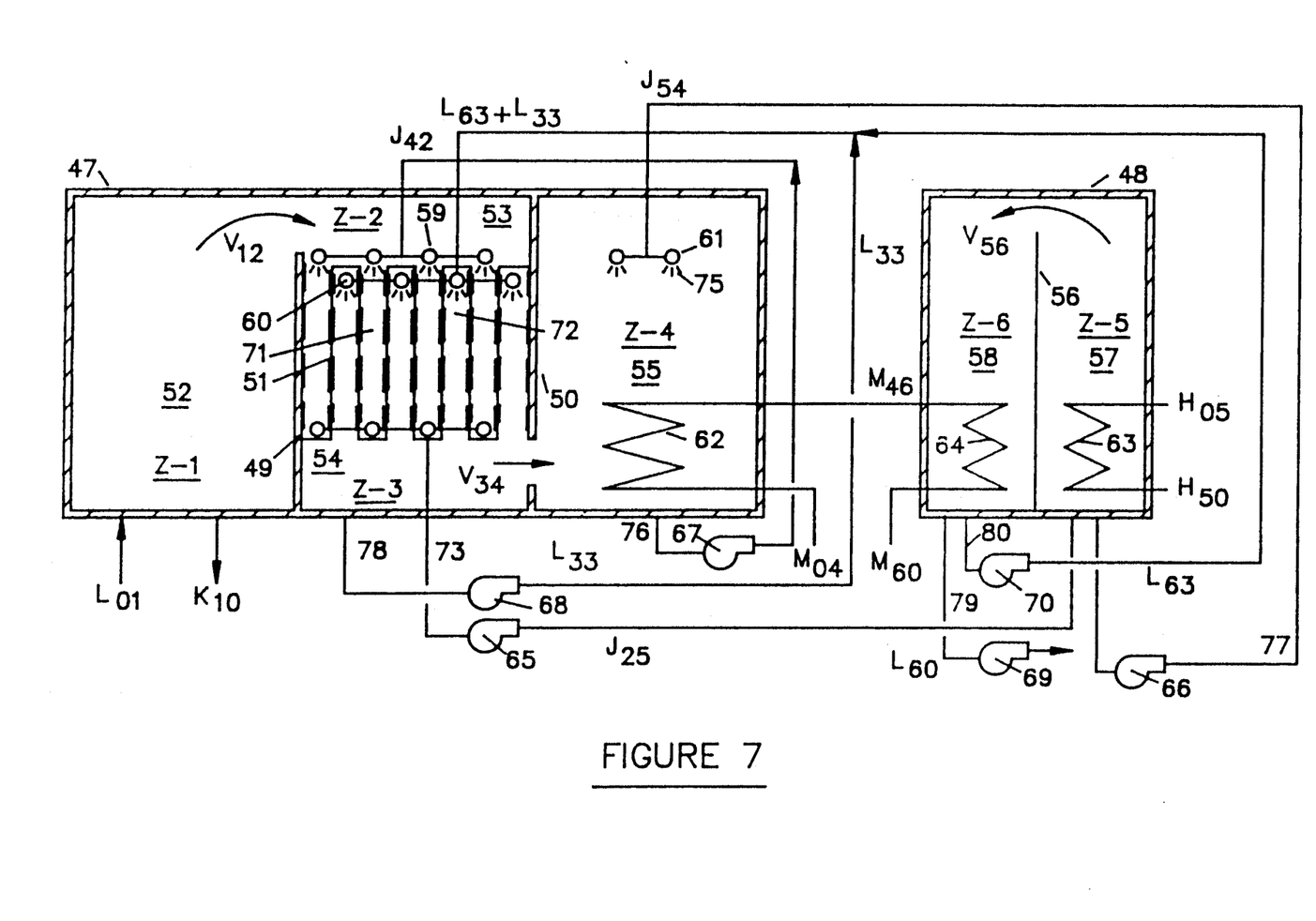

FIG. 7 illustrates a double effect absorption refrigeration system with a Type A pressure enhancer. By referring to FIGS. 1, 5, and 7, one can recognize that the system of FIG. 7 can be obtained by inserting a Type A pressure enhancer of FIG. 1 into a conventional absorption refrigeration system of FIG. 5. The system comprises a first vessel 47 and a second vessel 48. In the first vessel, there are two main vertical partitioners 49 and 50 and a multitude of vertical partitioners 51. There are a first processing zone 52, a second processing zone 53, a third processing zone 54 and a fourth processing zone 55. Zone 1 is a first vapor generation zone; Zone 2 is a first absorption zone for absorbing the first vapor; Zone 3 is a second vapor generation zone; and Zone 4 is a second absorption zone absorbing the second vapor. In the second vessel, there is a main partitioner 56 that separates the vessel into a fifth processing zone 57 (Zone 5) and a sixth processing zone 58 (Zone 6). Zone 5 is a generator section; Zone 6 is a condenser section. There is a first spraying device 59 in Zone 2; there is a second spraying device 60 in Zone 3; there is a third spraying device 61 in Zone 4. There are heat transfer coils 62,63, and 64 respectively in Zone 4, Zone 5, and Zone 6. There are pumps 65, 66, 67,68,69, and 70 for circulating various liquid streams. There are narrow vertical compartments 71 in Zone 2 and there are narrow vertical compartments 72 in Zone 3.

There are two absorption operations taking place in Zone 2 and Zone 4. Therefore, the degree of temperature lifting that can be accomplished in this system is much greater than that of a conventional single effect system. In operation, a feed $L_{01}$ is introduced into Zone 1 and and is subjected to a solid-liquid-vapor multiple phase transformation operation to form a first vapor $V_{12}$ and a solid-liquid mixture $K_{10}$ under a first pressure $P_1$. The first vapor is absorbed in an absorbing solution $J_{42}$ and the heat is used to generate a second water vapor under a second pressure $P_2$ from a water stream $L_{63}+L_{33}$. This pressure enhancement is accomplished by a Type A enhancement operation. The second vapor $V_{34}$ is absorbed by an absorbing solution $J_{54}$ and the heat released in this absorption operation is removed by a heat transfer medium $M_{04}$. The diluted absorbing solution 73($J_{25}$ stream) is sent to the generator (Zone 5) by the pump 65. The solution is subjected to an evaporation operation by the heating medium $H_{05}$ to produce a concentrated absorbing solution 77 ($J_{54}$ stream), which is heat exchanged with the cold solution $J_{25}$ and pumped by the pump 66 to Zone 4. The diluted absorbing solution 76 ($J_{42}$ stream) is pumped by the pump 67 and is introduced into Zone 2. A part of the water $L_{63}+L_{33}$ is vaporized to become the second vapor $V_{34}$. The remaining liquid $L_{33}$ is pumped by the pump 68 and recycled to Zone 3. The vapor formed in the generator $V_{56}$ is condensed; a part of the condensate $L_{60}$ is discharged from the system by the pump 69. The remaining condensate $L_{63}$ is pumped by the pump 70 and returned to Zone 3.

There are two absorption operations taking place in the system and the solutions are diluted by the absorption operations and concentrated by the generator section. A series arrangement is illustrated in the system of FIG. 7. The concentrated absorption solution $J_{54}$ enters Zone 4 and is diluted by absorbing the second vapor $V_{34}$ to form a diluted absorbing solution $J_{42}$ which becomes the absorbing solution in Zone 2. This solution is further diluted by absorbing the first vapor $V_{12}$ to become a twice diluted absorbing solution $J_{25}$, which is regenerated in the generator.

Figure 8:
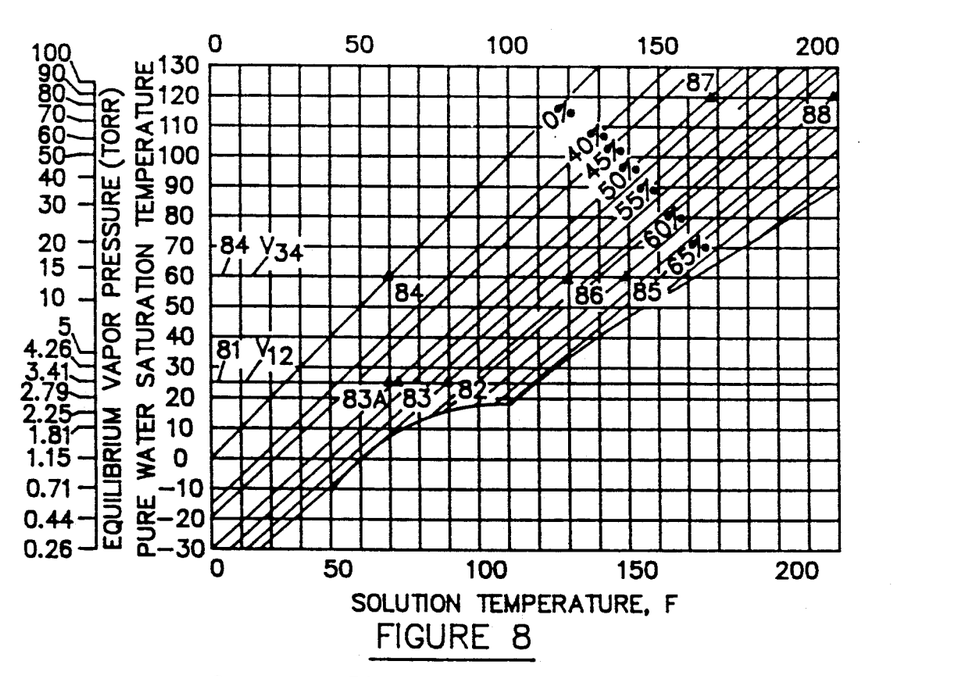
FIGS. 8 and 10 illustrate phase diagrams of lithium bromide-water systems. The operating conditions of the systems of FIGS. 7 and 9 are respectively illustrated in FIGS. 8 and 10.

The operating conditions of the two absorption operations and the regeneration operation are illustrated in FIG. 8. The pressure of the first vapor $V_{12}$ is illustrated by the horizontal line 81. The initial and final absorbing condtions in Zone 2 are respectively illustrated by point 82 and 83. The second vapor is formed at a temperature illustrated by 83A and the condition of the second vapor is illustrated by point 84. The second vapor is absorbed in the second absorption operation. The initial and final absorbing condtions in the second absorption operation are illustrated by points 85 and 86. The twice diluted absorbing solution 83 is heat exchanged and regenerated in the generator section. The initial and final conditions in the generator are illustrated by point 87 and 88. The conditions of the absorbing solutions follow the loop with a first step from 87 to 88 in the generator, a second step from 85 to 86 in the absorption in operation in Zone 4 and and a third step, from 82 to 83 in the absorption operation in Zone 2.

Figure 9:
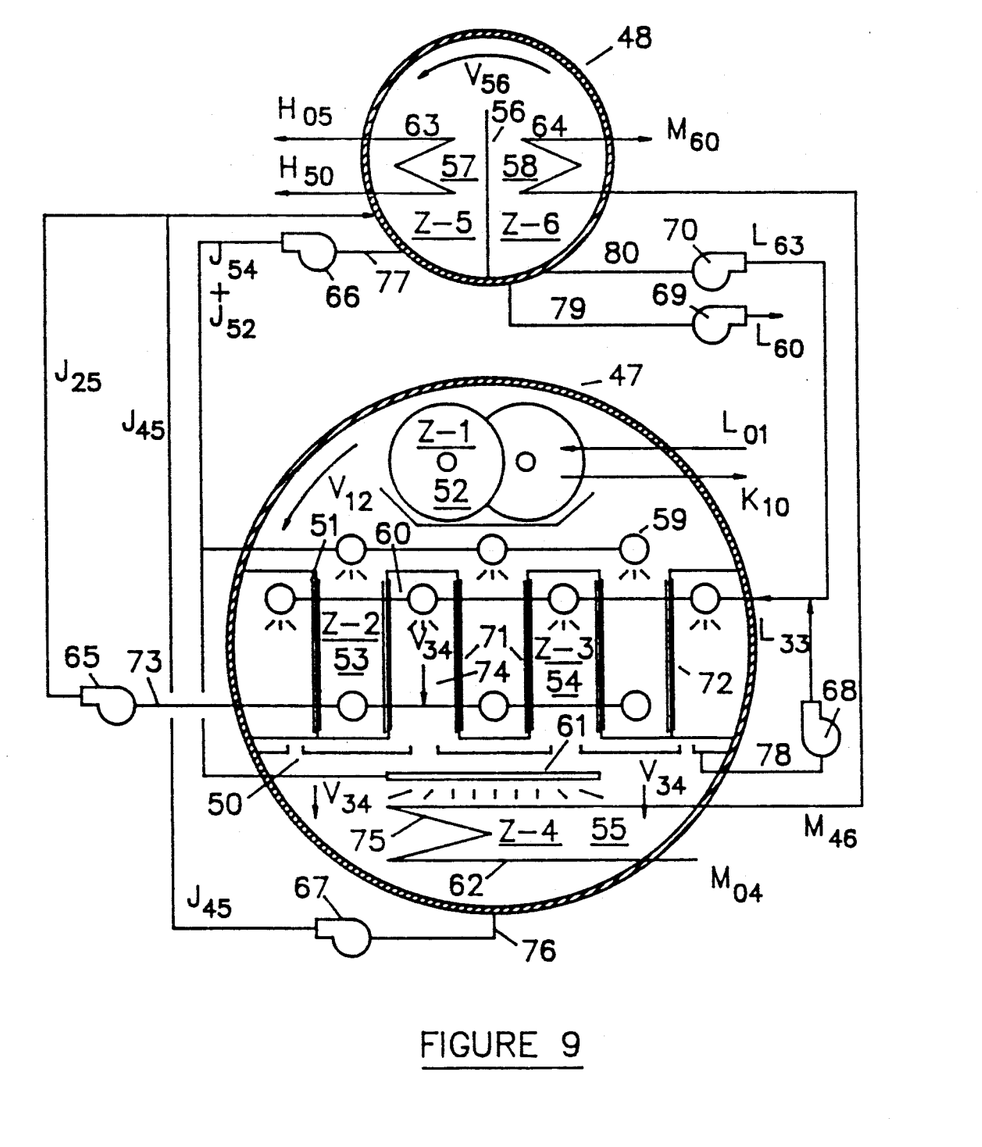

The system illustrated in FIG. 9 is similar to the system illustrated by FIG. 7. It also contains two vessels 47 and 48. Equivalent parts in the two figures are referred to by the same number. Therefore, the descriptions and operational procedures described in connection with the system of FIG. 7 can be used to describe the system and operating procedures of the system of FIG. 9. The only difference between the two systems are the flow arrangements of the absorbing solutions. In the system of FIG. 9, a parallel flow arrangement is shown. The absorbing solution after being concentrated in the generator section is divided into two streams, $J_{54}$ and $J_{52}$, which are respectively used as absorbing solutions in Zone 4 and Zone 2. The diluted absorbing solutions $J_{45}$ and $J_{25}$ are heat exchanged and returned to the generator to be reconcentrated.

Figure 10:
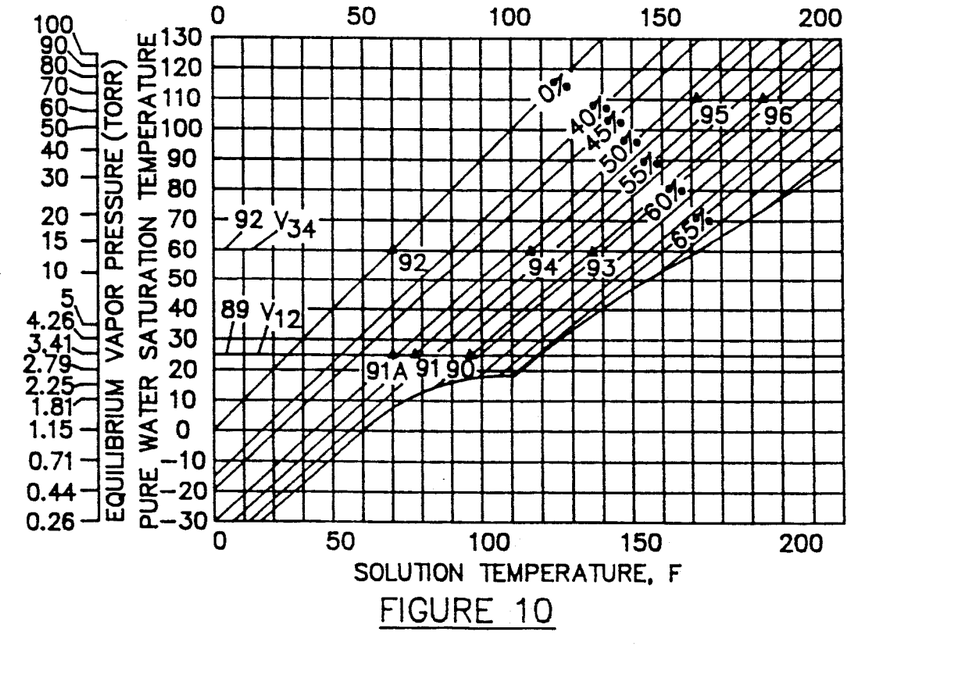

The conditions of the two absorbing operations and the reconcentration operation in the system of FIG. 9 are illustrated by various points in FIG. 10. The pressure of the first vapor is shown by the horizontal line 89. The initial condition and the final condition of the absorption operation in Zone 2 are illustrated by points 90 and 91. The second vapor is generated at the temperature of point 91A. The condition of the second vapor is illustrated by point 92. The initial and final absorption conditions in Zone 4 are illustrated by points 93 and 94. The two diluted absorbing solutions 91 and 94 are both returned to the generator. The initial and final conditions of the solution in the generator are illustrated by points 95 and 96.

It is noted that the absorbing solutions returned to the generator in the parallel arrangement are of lower concentration than that of a series arrangement. Therefore, the operation condition of the generator in the parallel arrangement are milder than those in the series arrangement. One may use a multiple effect evaporator in reconcentrating the absorbing solutions.

Figure 11:
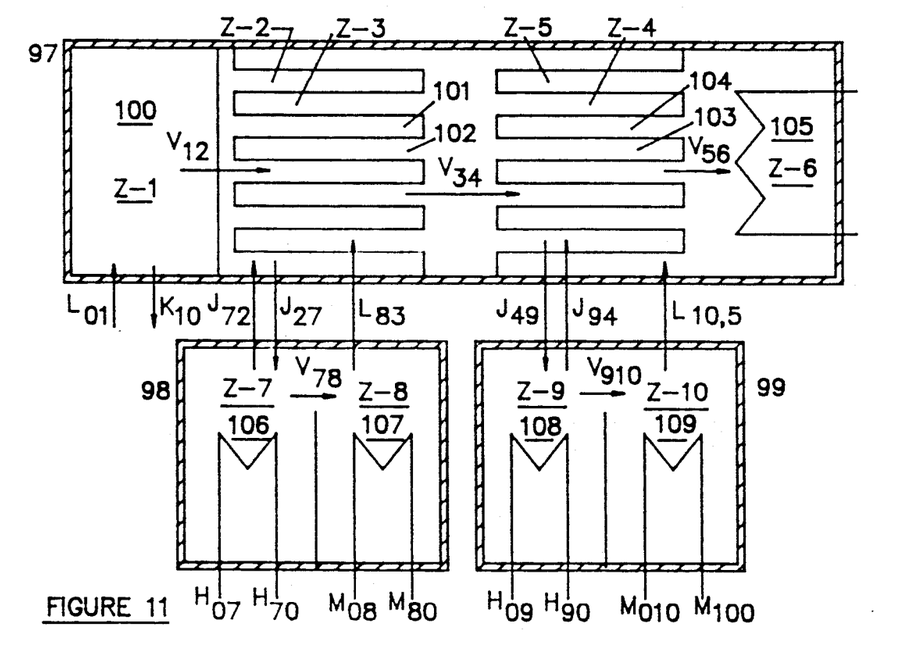
FIG. 11 illustrates yet another system in which Type A vapor pressure enhancement operations are used twice and the diluted absorbing solutions are regenerated independently. In the system, a first vapor is subjected to a first Type A operation to produce a second vapor and the second vapor is subjected to a second Type A operation to produce a third vapor. The third vapor is at such an elevated pressure that it is condensed by a readily available cooling medium.

FIG. 11 illustrates a system with two Type A pressure enhancing units. It also has two absorbers. The two diluted absorbing solutions are shown to be regenerated in two separate generators. The system comprises a first vessel 97, a second vessel 98, and a third vessel 99. The first vessel has a first processing zone 100 (Z-1) that contains a first vapor generator, a second processing zone 101 (Z-2) that contains an absorber for the first vapor, a third processing zone 102 (Z-3) that contains a second vapor generator, a fourth processing zone 103 (Z-4) that contains an absorber for the second vapor, a fifth processing zone 104 (Z-5) that contains a third vapor generator, and a sixth processing zone 105 (Z-6) that contains a condenser for the third vapor. The second vessel contains a seventh zone 106 (Z-7) which contains a first generator and an eighth zone 107 (Z-8) which contains a first condenser. The third vessel contains a ninth zone 108 (Z-9) that contains a second generator and a tenth zone (Z-10) that contains a second condenser.

In operation, a first vapor $V_{12}$ is generated in Zone 1; the first vapor is subjected to a first Type A pressure enhancement to generate a second vapor $V_{34}$; the second vapor is subjected to a second Type A pressure enhancement to generate a third vapor $V_{56}$; the third vapor is condensed in Zone 6 by a cooling water available. The first diluted absorbing solution $J_{27}$ is regenerated in Zone 7 and is returned as $J_{72}$; the second diluted absorbing solution $J_{49}$ is regenerated in Zone 9 and is returned as $J_{94}$. The vapor streams $V_{78}$ and $V_{910}$ that are generated in the generators are condensed in the condensers in Zone 8 and Zone 10 respectively.

Figure 12:
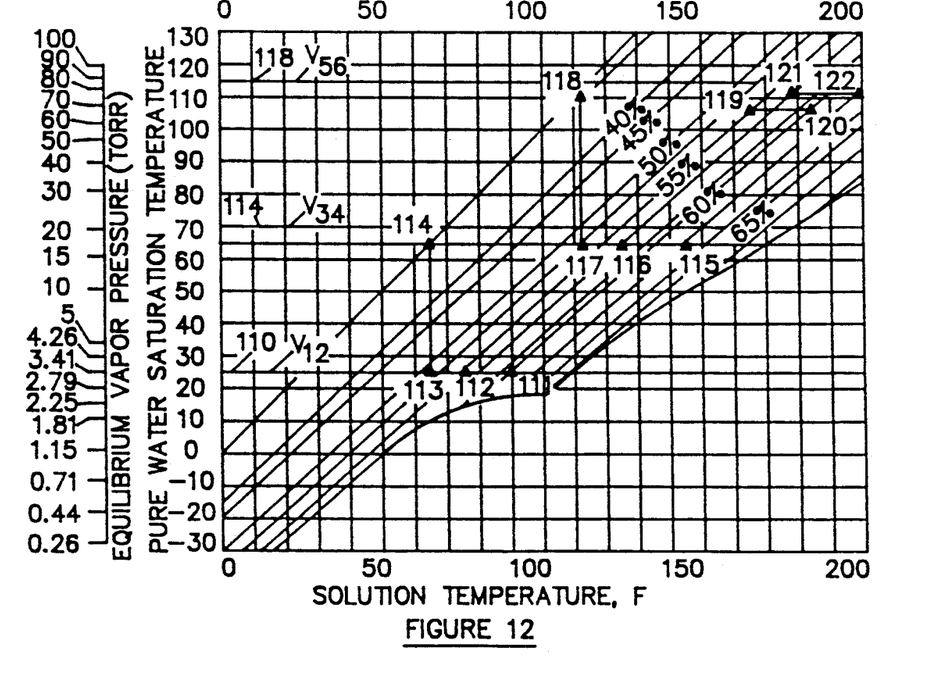

The conditions prevailing in the vapor generation operations, the vapor absorption operations and absorption solution regeneration operations are illustrated by various points in FIG. 12. The pressure of the first vapor $V_{12}$ is illustrated by the horizontal line 110; the initial and final conditons of the absorption operation in Zone 2 are illustrated by points 111 and 112; the temperature of generating the second vapor is shown by point 113; the condition of the second vapor $V_{34}$ is shown by point 114; the initial and final condition of the absorption operation in Zone 4 are shown by points 115 and 116; the temperature at which the third vapor is generated is shown by point 117; the condition of the third vapor is shown by point 118. The initial and final conditions in the regeneration of the first diluted absorbing solutions are illustrated by points 119 and 120; the initial and final conditions in the regeneration of the second absorbing solution are illustrated by points 121 and 122.

Figure 13:
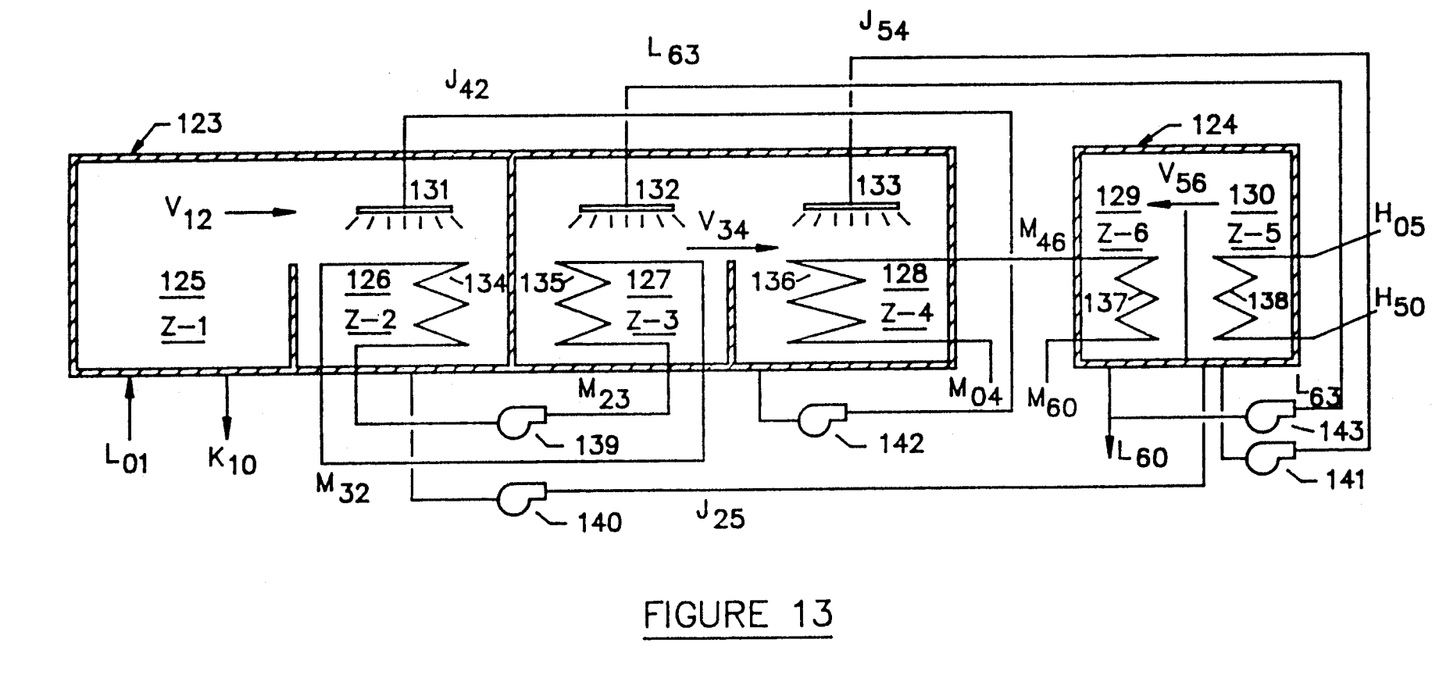
FIG. 13 illustrates integrated systems in which first vapors are subjected to Type B vapor pressure enhancement operations using first absorbing solutions to produce second vapors and the second vapors at elevated pressures are absorbed into second absorbing solutions at elevated temperatures so that heat released in the absorption operations are removed by cooling mediums at temperatures that are readily available. The diluted absorbing solutions are regenerated and recycled.

The system illustrated by FIG. 13 has a Type B pressure enhancer. This system is similar to the system of FIG. 7 and can be obtained by replacing the Type A pressure enhancer by the Type B pressure enhancer. The operations of the two systems are similar.

The system has a first vessel 123 and a second vessel 124. The first vessel contains a first zone 125 (Z-1) that contains a first vapor generator, a second zone 126 (Z-2) that contains an absorber for the first vapor, a third zone 127 that contains a second vapor generator and a fourth zone 128 that contains an absorber for the second vapor. The second vessel has a fifth zone 130 that contains a generator and a sixth zone 129 that contains a condenser. There are sprayers 131, 132 and 133 in Zone 2, Zone 3 and Zone 4 respectively; there are heat transfer coils 134, 135, 136, 137, and 138 in the zones. There are pumps 139, 140, 141, 142, and 143 for circulating various liquid streams. Since the system description and system operation are similar to those of the system of FIG. 7 detailed descriptions are omitted.

Figure 14:
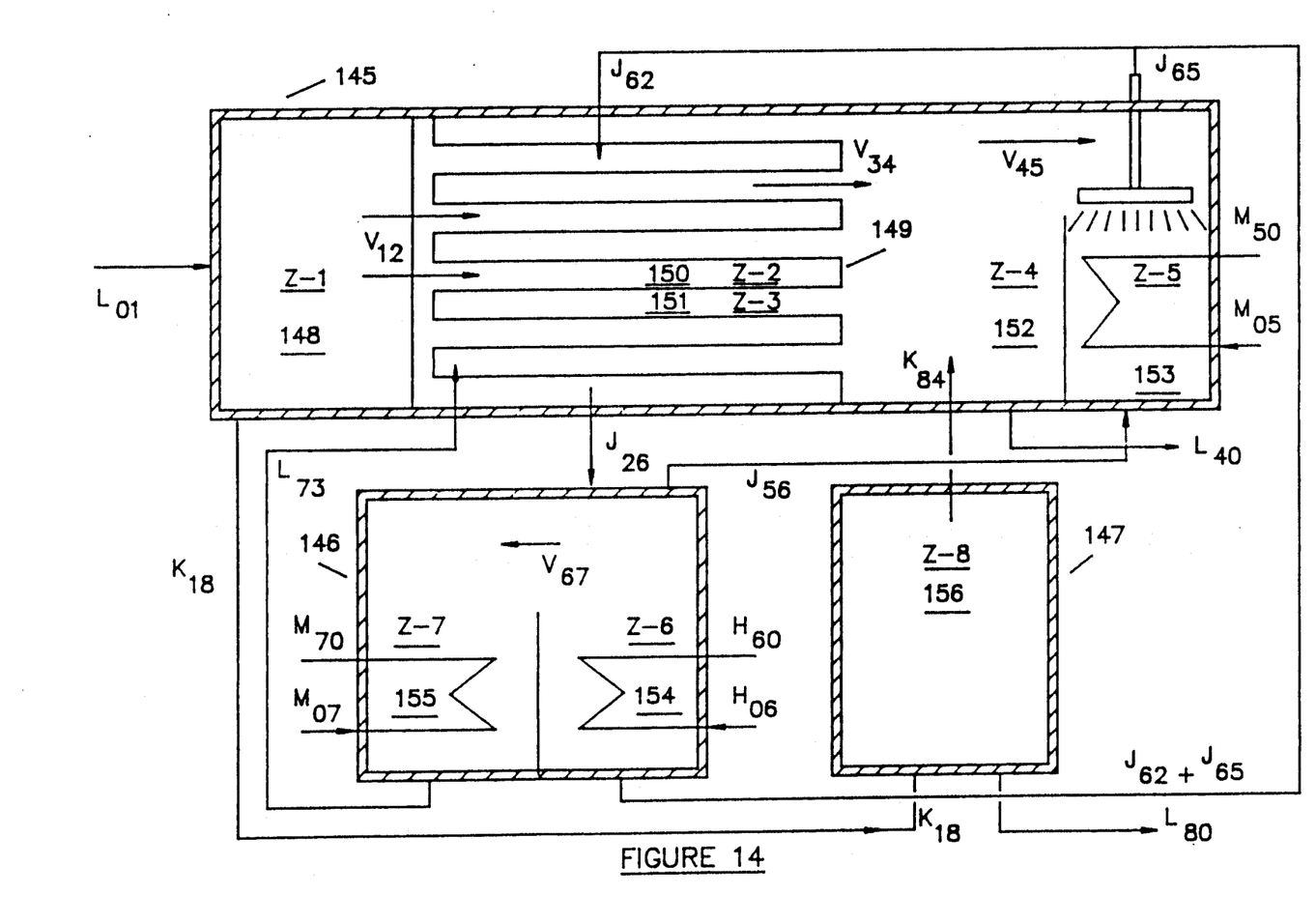

FIG. 14 illustrates a multiple phase transformation process with coupled vapor absorption and crystal melting operations. In this system, the first vapor formed in a solid-liquid-vapor multiple phase transformation operation is subjected to a Type A vapor pressure enhancement operation using a first absorbing solution to thereby produce a second vapor whose pressure is higher than the triple point pressure of the solvent crystals. The second vapor is brought in contact with a mass of solvent crystals to thereby simultaneously condense the second vapor and melt the solvent crystals. The system requires an auxiliary refrigeration system to maintain the system under a properly balanced state. The needed auxiliary refrigeration is accomplished by absorbing a fraction of the second vapor into a second absorbing solution and removing the heat of absorption by a cooling medium at a readily available temperature. The first absorbing solution and the second absorbing solution may be the same solution and be regenerated together.

The system comprises a first vessel 145, a second vessel 146 and a third vessel 147. There is a Type A pressure enhancer in the first vessel. The first vessel contains a first zone 148 (Z-1) that contains a first vapor generator, a vertical wall partition 149, a second processing zone 150 (Z-2) that contains an absorber for the first vapor, a third processing zone 151 (Z-3) that contains a second vapor generator, a fourth processing zone 152 (Z-4) that contains a crystal melter, a fifth prcessing zone 153 that contains an absorber for an excess second vapor. The second vessel contains a sixth processing zone 154 that contains a generator for regenerating the absorbing solution and a seventh processing zone 155 that contains a vapor condenser. The third vessel contains an eighth processing zone (Z-8) that contains a crystal washer.

The system can be used in conducting a solid-liquid-vapor multiple phase transformation process. A feed $L_{01}$ is introduced in zone 1 and is subjected to a multiple phase transformation to produce a first vapor $V_{12}$ and a solid-liquid mixture $K_{18}$. The first vapor is subjected to a Type A pressure enhancement to produce a second vapor $V_{34}$. The crystals in the solid-liquid mixture $K_{18}$ are washed and purified in Zone 8 to produce a concentrate $L_{80}$ and a purified solid-liquid mixture $K_{84}$. The second vapor is brought in contact with $K_{84}$ in Zone 4, condenses and simultaneously melts the crystals to produce a purified product $L_{40}$. Because of heat leakage into the system and imperfect heat exchange operations, the amount of second vapor produced is greater than the amount that can be condensed by melting the crystals in $K_{84}$. Therefore, there is some excess second vapor $V_{45}$. The excess second vapor is absorbed by a second absorption operation and the heat of absorption is removed by a cooling medium entering as $M_{05}$ and leaving as $M_{50}$. The diluted absorbing solution $J_{26}$ from Zone 2 and the diluted absorbing solution $J_{56}$ from Zone 5 are reconstituted in the generator in Zone 6 by a heating medium that enters as $H_{06}$ and leaves as $H_{60}$. The concentrated absorbing solution is divided into two streams $J_{62}$ and $J_{65}$ and are respectively used in Zone 2 and Zone 5. The vapor $V_{67}$ formed in the generator is condensed in Zone 7 by a cooling medium that enters as $M_{07}$ and leaves as $M_{70}$.

In conclusion, the following remarks are presented:

(1) A cooling medium is needed to remove heat from an absorption operation or a condensation operation. It is important to distinguish an internal cooling medium from an external cooling medium. An internal cooling medium is one that is regenerated and recycled within the system. For example, $L_{63}$ and $L_{33}$ in FIG. 7 that are used to remove heat of absorption in Zone 2 and therby partially vaporized is an internal cooling medium because the water that becomes the second vapor is absorbed in Zone 4 and is recovered and recycled after being vaporized in Zone 5 and condensed in Zone 6. An external cooling medium refers to a cooling medium that is not recycled within the system. Examples are (a) ambient air, (b) well water, lake water, and river water and (c) cooling water recycled from a cooling tower in which heat has been rejected to the ambient air.

(2) An external cooling medium is available at 80° F. to 90° F. and can be used until its temperature reaches 110° F. to 120° F.

(3) A conventional absorption refrigeration system can remove heat at 40° F. and is therefore able to produce chilled water at 40° F. It has not been able to produce ice. A system of the present invention can remove heat at a much lower temperature. Therefore, it can be used to produce ice.

(4) The word "effect" will be used to refer both to a vapor absorption operation and a pressure enhancement operation. A unit represented by either FIG. 1 and FIG. 3 is one effect of pressure enhancement. The system of FIG. 7 or FIG. 9 has one effect of pressure enhancement and two effects of vapor absorption. The system of FIG. 11 has two effects of pressure enhancements and two effects of vapor absorption. The system of FIG. 13 has one effect of pressure enhancement and two effects of vapor absorption.

What are claimed are as follows:

1. A process of transforming a solvent vapor at a first pressure $P_1$ having a corresponding first pure solvent saturation temperature $T_1$ to a final liquid mass by transferring heat to an external cooling medium at temperature $T_M$ which is considerably higher than the first vapor saturation temperature $T_1$ by subjecting the first vapor to one or more effects of pressure enhancement operations, the final effect having referred to as N-th effect and general effect being referred to as n-th effect, and a final step of transforming the vapor leaving the last effect of pressure enhancement operation into the final liquid mass by transferring heat to the external cooling medium, the vapor entering and leaving the n-th effect pressure enhancement operation being referred to as n-th vapor and (n+1)th vapor, and the process conducted in the n-th effect pressure enhancement comprises:

(a) a first step of absorbing the n-th vapor in a n-th pure solvent saturation temperature $T_n$, under n-th pressure $P_n$ by a n-th absorbing solution containing the solvent and one or more low volatility solutes at a temperature $(T_a)_n$ that is substantially higher than the n-th saturation temperature $T_n$, (b) a second step of transmitting heat released in the absorption operation in the n-th processing zone to a liquid containing the solvent in a (n+1)th processing zone to generate (n+1)th solvent vapor at a (n+1)th pressure, $P_n+1$, that is substantially higher than the n-th pressure $P_n$.

2. A process of claim 1, wherein the n-th effect pressure enhancement operation is conducted in an n-th processing zone and an (n+1)th processing zone that are separated by vertical heat conducting partitions and the n-th solvent vapor is absorbed in the n-th absorbing solution forming a falling liquid film on one side of the vertical partitioners and the (n+1)th solvent vapor is generated from a film of liquid containing the solvent formed on the other side of the vertical partitioners.

3. A process of claim 1, wherein the n-th effect pressure enhancement operation is conducted in an n-th processing zone having a heat exchange coil therein and an (n+1)th processing zone containing another heat exchange coil, the two coils are connected to form a loop and an internal heat transfer medium is circulated therein, the heat released in absorbing the n-th vapor in the n-th zone is transmitted through the internal heat transfer medium to a mass of liquid containing the solvent in the (n+1)th zone.

4. A process of claim 1, wherein the final step of transforming the (N+1)th solvent vapor generated in the final effect (N-th effect) of pressure enhancement into a final liquid mass comprises a step of absorbing the (N+1)th vapor into another absorbing solution, N-th absorbing solution, containing the solvent and one or more low volatility solutes and releasing the heat of absorption to the external cooling medium.

5. A process of claim 4, wherein the solvent is water.

6. A process of claim 4, wherein the solvent is water and the number of effect (N) of pressure enhancements is one.

7. A process of claim 1, wherein the solvent is water.

8. A process of claim 1, wherein the final step of transforming the (N+1)th solvent vapor generated in the final effect (N-th effect) of pressure enhancement into a final liquid mass comprises a simple condensation operation releasing the heat of condensation to the external cooling medium.

9. A process of claim 8, wherein the solvent is water.

* * * * *